United States Patent [19]
Kozak et al.

[11] Patent Number: 5,803,745
[45] Date of Patent: Sep. 8, 1998

[54] SYSTEM AND METHOD FOR EXERCISING A USER'S CONCENTRATION AND MOTOR SKILLS

[75] Inventors: Edward J. Kozak, Shreveport, La.; James L. Bailey; John W. Quinley, both of Provo, Utah

[73] Assignee: 1-O-X Corporation, Shreveport, La.

[21] Appl. No.: 677,349

[22] Filed: Jul. 2, 1996

[51] Int. Cl.[6] .................................................. G09B 19/00
[52] U.S. Cl. .......................................... 434/236; 434/258
[58] Field of Search .................................... 434/179, 184, 434/185, 223, 227, 228, 230, 236, 237, 247, 250, 257, 258

[56] References Cited

U.S. PATENT DOCUMENTS

| | | | |
|---|---|---|---|
| 3,869,812 | 3/1975 | Arakelian et al. | 434/258 |
| 4,730,253 | 3/1988 | Gordon | 434/236 |
| 4,955,602 | 9/1990 | Rastelli | 434/258 |
| 5,009,419 | 4/1991 | Streeter | 273/454 |

*Primary Examiner*—Richard J. Apley
*Assistant Examiner*—John Rovnak
*Attorney, Agent, or Firm*—Harry M. Weiss; Jeffrey D. Moy; Harry M. Weiss & Associates, P.C.

[57] ABSTRACT

A system and method is shown for exercising a user's motor skills and concentration, comprising, in combination, a controller for providing a plurality of visual images and sounds, a first sensor for providing an input to the controller when activated by a hand on a selected right or left side of the user, a second sensor for providing an input to the controller when activated by a foot on the selected side of the user, a third sensor for providing an input to the controller when activated by a hand located opposite the selected side, and a fourth sensor for providing an input to the controller when activated by a foot located opposite the selected side. The system displays a plurality of visual images where each visual image contains four separate quadrants corresponding to the first, second, third, and fourth sensors. Additionally, the system includes features for changing the color of portions of a selected quadrant, thereby prompting the user to activate one of the sensors corresponding to the selected quadrant, with the selected quadrant sequencing from visual image to visual image. The system also includes features for adjusting the speed of progression of the sequence, providing sounds to identify which visual image is selected, and providing sounds for distracting the user's concentration.

18 Claims, 1 Drawing Sheet

SYSTEM AND METHOD FOR EXERCISING A USER'S CONCENTRATION AND MOTOR SKILLS

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATION

This patent application is related to issued U.S. Pat. No. 3,657,456 entitled "Coordinator Device Rhythm," in the name of Edward J. Kozak, and is incorporated herein by reference.

MICROFICHE APPENDIX 5 microfiche covering 340 frames are attached to this application.

BACKGROUND OF THE INVENTION

1. Field of the Invention

This invention is in the field of systems for exercising and improving motor skills and concentration and methods therefor and, more particularly, is a system and a method for exercising a user's concentration and motor skills by testing the user's activation of right and left hand and foot sensors in response to system prompts to select one of these sensors.

2. Description of the Related Art

All people possess concentration and motor skills in varying degrees. These skills range in varying degree from an infant, for example, who essentially has no motor skills and little concentration to skilled athletes who ordinarily possess extraordinary motor skills with intense concentration ability. Infants begin the development of concentration and motor skills through crawling toward and reaching for visually stimulating objects. Highly trained athletes refine their exceptionally developed motor skills and concentration through the constant and repetitive practice of the hand eye coordination exercises their sport requires.

The average person has developed concentration and motor skills sufficient for their day to day activities, but typically does not continue to engage in activities that refine or develop new motor skills and concentration. Additionally, some people have physical or mental ailments, which impede development of or degrade existing motor skills and concentration, such as the impairments suffered by stroke victims or those with Attention Deficit Disorder. Historically, in order to exercise motor skills and concentration, either for the average person or for one suffering from physical and/or mental impairments, required the expensive and prolonged aid of a trained specialist. Even with the aid of such a specialist, few people could afford the time or expense to work on motor skill and concentration exercises every day, even if the need existed.

While this problem has been alleviated somewhat with mechanical apparatus, these apparatuses tend to be expensive, cumbersome, and many still require the services of trained specialists to utilize them. Therefore, there existed a need to provide an improved, inexpensive, and user-friendly system for exercising of concentration and motor skills, and a method therefor.

SUMMARY OF THE INVENTION

An object of the present invention is to provide a system for exercising the motor skills and concentration of a user and a method therefor.

Another object of the present invention is to provide a system for exercising the left or right side of the brain by providing a system for exercising the right or left sides, respectively, of the user's body and a method therefor.

Still another object of the present invention is to provide a system for exercising the left and right sides of the brain by providing a system for exercising the right and left sides, respectively, of the user's body and a method therefor.

BRIEF DESCRIPTION OF THE PREFERRED EMBODIMENTS

In a preferred embodiment of the present invention, a system for exercising a user's concentration and motor skills is disclosed comprising, in combination, control means for providing a plurality of visual images and sounds, first sensor means coupled to the control means for providing a first input to the control means when the first sensor means is activated by a hand on a selected side of the user, the selected side being one of the user's left and right sides, and second sensor means coupled to the control means for providing a second input to the control means when the second sensor means is activated by a foot on the selected side of the user. The system further comprises third sensor means coupled to the control means for providing a third input to the control means when the third sensor means is activated by a hand located opposite the selected side, and fourth sensor means coupled to the control means for providing a fourth input to the control means when the fourth sensor means is activated by a foot located opposite the selected side. Additionally, each visual image of the plurality of visual images includes four separate quadrants wherein each quadrant corresponds to one of the first, second, third, and fourth sensor means. The control means includes means for changing at least a portion of a selected quadrant from a first color to a second color and thereby providing prompts to the user to activate one of the first, second, third, and fourth sensor means corresponding to the selected quadrant. The control means further includes means for changing at least the portion of the selected quadrant from the first color to the second color in a sequence progressing through a selected quadrant in each visual image. The control means also includes means for adjusting the speed of progression of the sequence. As previously noted, the control means provide sounds which provide means for identifying when a visual image of the plurality of visual images has the selected quadrant therein. Alternatively, the control means may provide sounds which provide means for distracting the user's concentration. In the above-identified embodiment, the system simultaneously exercises both sides of the user's brain by testing the user's response to right and left hand and foot prompts. In contrast, the embodiment discussed immediately below discloses a system for exercising one side of the brain at a time by prompting user response for either his left or right side at any given time.

In another embodiment of the present invention, a system for exercising a user's concentration and motor skills is disclosed comprising, in combination, control means for providing a plurality of visual images and sounds, first sensor means coupled to the control means for providing a first input to the control means when the first sensor means is activated by a hand on a selected side of the user, the selected side being one of the user's left and right sides, second sensor means coupled to the control means for providing a second input to the control means when the second sensor means is activated by a foot on the selected side of the user, and wherein each visual image of the plurality of visual images includes four separate quadrants wherein each quadrant corresponds to one of the first and the second sensor means. The control means includes means for changing at least a portion of a selected quadrant from a first color to a second color and thereby providing prompts to the user to activate one of the first and the second sensor means corresponding to the selected quadrant. The control means also includes means for changing at least the portion of the selected quadrant from the first color to the second color in a sequence progressing through each visual image of the plurality of visual images. Moreover, the control means includes means for adjusting the speed of progression of the sequence. The sounds from the control means provide means for identifying when a visual image of the plurality of visual images has the selected quadrant therein. Alternatively, the sounds may provide means for distracting the user's concentration.

In another embodiment of the present invention, a method for exercising a user's concentration and motor skills is disclosed comprising the steps of providing control means for providing a plurality of visual images and sounds, providing first sensor means coupled to the control means for providing a first input to the control means when the first sensor means is activated by a hand on a selected side of the user, the selected side being one of the user's left and right sides, and providing second sensor means coupled to the control means for providing a second input to the control means when the second sensor means is activated by a foot on the selected side of the user. Further included are the steps of providing third sensor means coupled to the control means for providing a third input to the control means when the third sensor means is activated by a hand located opposite the selected side, and providing fourth sensor means coupled to the control means for providing a fourth input to the control means when the fourth sensor means is activated by a foot located opposite the selected side. Further included is the step of providing that each visual image of the plurality of visual images includes four separate quadrants wherein each quadrant corresponds to one of the first, second, third, and fourth sensor means. The step of providing the control means comprises the steps of changing at least a portion of a selected quadrant from a first color to a second color and thereby providing prompts to the user to activate one of the first, second, third, and fourth sensor means corresponding to the selected quadrant. The step of changing at least the portion of the selected quadrant from the first color to the second color progresses through each visual image of the plurality of visual images in a sequence. Further included is the step of adjusting the speed of progression of the sequence with the control means. The method also includes the step of providing the sounds as means for identifying when a visual image of the plurality of visual images has the selected quadrant therein. Alternatively, the step of providing the sounds may serve as means for distracting the user's concentration.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENTS

Figure 1:
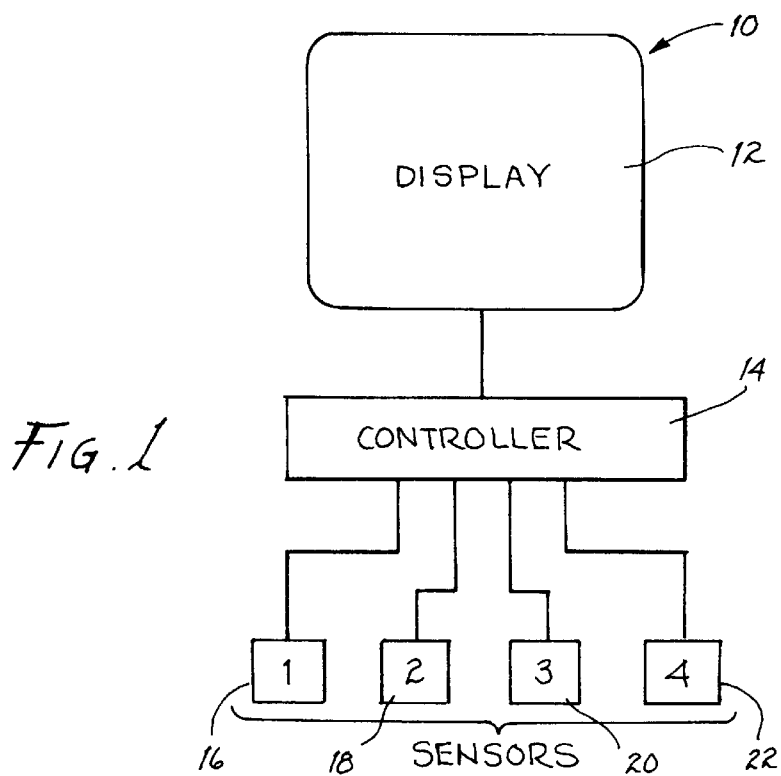
FIG. 1 is a simplified functional block diagram of the instant invention.

Referring to FIG. 1, a simplified functional block diagram is shown of the system for exercising a user's concentration and motor skills, or more simply, the system, generally referred to by reference number 10.

Viewing the system 10 broadly, it is comprised of a display 12 which is used to show a plurality of visual images. The display 12 may be what is known generically as a video display, video monitor, computer monitor or additionally may be a display system such as a liquid crystal display screen or a projection TV or video system, or even a standard television. Continuing with the system 10, the display 12 is coupled to a controller 14. In the instant invention the controller 14 is a computing device or machine such as a personal computer known by such designations as an IBM PC, an Apple Macintosh or PowerMac, and many other equivalents. Those skilled in the art recognize that the controller 14 may also however, be some other type of computing machine such as a Sega game system or a self contained unit where the display 12 and the controller 14 are one unit such as a GameBoy or a portable notebook style computer. The controller 14 includes control means such as a computer program. The functions provided by the computer program of the instant invention may be accomplished in many different high or low level languages which are well known to those skilled in the art. In the preferred embodiment of the instant invention, the computer program was written in the high level programming language "Visual C++" and is shown in the enclosed microfiche appendix. The computer program directs the actions of the controller 14. The computer program may be stored on floppy discs, hard discs, tapes, or directly on electronic components all of which are well known in the art. The computer program may then be accessed by the controller 14 so as to perform the functions provided by the system 10 such as displaying a plurality of visual images on the display 12.

The sensors 16–22 may be coupled to the controller 14 in any one of a variety of different methods well known to those skilled in the art. The sensors 16–22 may be coupled via low voltage or low current connection ports of the controller 14 (not shown) which are designed to detect the activation of the sensors 16–22 by the user. The signals transmitted from the sensors 16–22 may be in either analog or digital form but in either case will convey the requisite information regarding the status of the sensors 16–22. The sensors 16–22 are intended to report the movements of different body parts. In particular, the sensors 16–22 are intended to report to the controller 14 when the user activates a corresponding one of the sensors 16–22 with his or her left hand, right hand, right foot and left foot. If desired, these or other sensors may be used with other body parts such as individual fingers, the head, the shoulders, or the knees in order to sense the movement of different body parts or portions thereof.

In the preferred embodiment, the sensors 16–22 of the instant invention incorporate electrical push button, momentary contact, normally open, single throw, single pole switches and they are operated by the user's left or right hand or foot in direct contact with the corresponding one of the sensors 16–22. Those skilled in the art recognize that other types of sensors could be implemented in system 10, if desired. For example, one could use sensors having optical or photo electric switches in order to couple the appropriate part of the user's anatomy to the controller 14.

Figure 2:
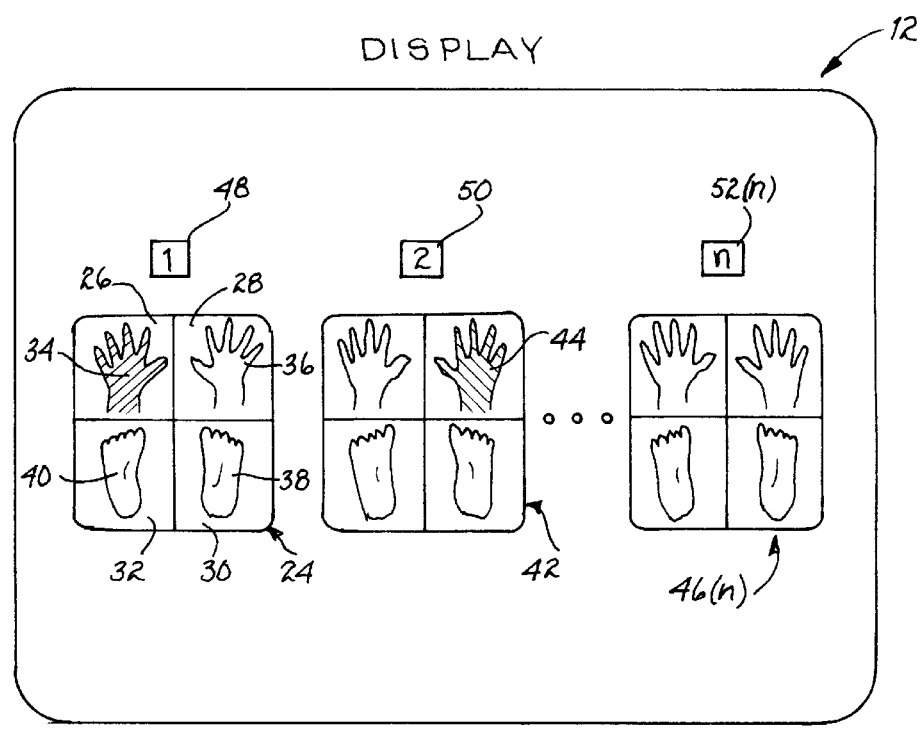
FIG. 2 shows the display in FIG. 1 and some of the visual images projected thereon.

Referring to FIG. 2, the display 12 of FIG. 1 is shown. The display 12 shows a plurality of visual images 24, 42 and 46(n). Visual images 24 and 42 represent the first and second visual images, the minimum number of visual images used for operation of the instant invention. However, if desired, a single visual image could be used in another embodiment. The visual image 46(n) is representative of a variable number of visual images possible in the instant invention. In other words, the display 12 may in one case show only visual images 24 and 42, or alternatively, may show in addition to visual images 24 and 42, a third, fourth, or nth visual image as represented by visual image 46(n). While the instant invention has a preferred number of 4 visual images 24, 42, 46(1), and 46(2), more than 4 visual images is possible if desired. The identification numbers 48, 50 and 52(n) assist the user in the identification of the active visual image. Details regarding the selected or active visual images will be discussed below; however for now, it is sufficient to state that the selected or visual image is the one of the plurality of visual images having a highlighted portion therein which prompts the user to activate the corresponding one of the sensors 16–22. Identification numbers 48 and 50 are the numerals "1" and "2". The identification number 52(n) may either be not used for the case when only visual images 24 and 42 are shown, or may be the 3rd identification number in the series of identification numbers 48, 50 and 52(1), or lastly the identification number 52(n) may be the 3rd and 4th identification numbers in the series of identification numbers 48, 50, 52(1), and 52(2). As the sequence of visual images 24, 42 and 52(n) progresses, the identification numbers 48, 50 and 52(n) change color or are brightened as an indication of which visual image 24, 42 and 52(n) is currently the active or selected visual image. While the instant invention shows four identification numbers 48, 50, 52(1) and 52(2), greater than four identification numbers is possible. Moreover, if more than four visual images 24, 42, and 46(n) are implemented, then the number of identification numbers 48,50, and 52(n) would correspond to the number of visual images 24, 42, and 46(n) shown on the display 12.

The visual images 24, 42, and 46(n) are each split into four quadrants 26–32. Each quadrant 26–32 contains an outline of one of a left hand 34, a right hand 36, a right foot 38 or a left foot 40, respectively. These outlines of the left hand 34, right hand 36, right foot 38 and left foot 40 correspond to the sensors 16, 18, 20 and 22 which are coupled to the user's left hand, right hand, right foot and left foot, respectively. The outlines 34–40 are filled in with colors or patterns that change as the computer program sequences through the selection of the appropriate quadrant within the active visual image 24, 42 or 46(n). As the sequence progresses in the instant invention, the active or selected outline from one of the left hand 34, right hand 36, right foot 38 and left foot 40 will become a specific color denoting that the corresponding sensor 16, 18, 20 or 22 should be immediately activated by the user. The left hand 34 within visual image 24 is shown with a cross hatch pattern by way of example to denote that this is the selected quadrant, and the corresponding sensor 16 should be depressed. The right hand 44 within image 42 is shown with a different cross hatch pattern and is representative of a different color that denotes that the right hand 44 is going to become the active selection as the sequence progresses from visual image 24 to visual image 42. As the sequence progresses, visual image 42 becomes active, and the right hand 44 in visual image 42 will change color to the active color as shown for the left hand 34 in visual image 24 which is, as shown, currently active. The outlines that are not either selected or designated to become selected are filled in with a third (not shown) color or pattern.

Not shown in the figures but included as part of the system 10 is means for providing sound to the user. The sound portion of the instant invention consists of two different types or classes of sound. The first type of sound is a simple counting sequence that plays the words "one, two, three, four" which corresponds to the highlighting of the identification numbers 48, 50, and 52(n), and follows the sequence of selecting the visual images 24, 42 and 46(n). Note that the maximum number of the count matches the maximum number of visual images 24, 42 and 46(n) shown. The second type of sound that is part of the system 10 is a series of Musical Instrument Digital Interface (MIDI) or conventional Compact Disc (CD) music files that plays in a rhythm that is distinct from the rhythm of the visual images sequencing. The playing of MIDI or CD music files that is uncoordinated with the rhythm of the visual images sequencing is for the purpose of providing a distraction to the user's concentration, as opposed to an aid in his or her selection of the appropriate sensor 16, 18, 20, or 22. The techniques for providing and playing MIDI or CD files are well known in the art. Moreover, the process of generating sounds, such as described above, with the aid of a controller 14 and appropriate software is well known to those skilled in the art. Additionally, the use of the controller 14 and its associated computer program to generate a plurality of visual images is also well known to those skilled in the art.

OPERATION

The system 10 is designed to increase the users coordination between the four extremities (i.e., left hand, right hand, left foot, right foot)in a logical and measurable fashion by exercising the user's motor skills and concentrations skills. In particular, use of the system 10 requires the user to recognize when a quadrant has been selected which necessitates visual and cerebral recognition. Subsequently, the user's brain must then tell the user which of the sensors 16–22 to activate. As the user executes the above-identified process in response to the displayed sequence of selected outlines 34–40 provided by the system 10, his or her motor and concentration skills are exercised, and improved with practice over time. Note that it is generally understood that cerebral control for the left and right sides of the body arise from the right and left sides of the brain, respectively. Accordingly, the exercising of the user's left or right sides of the physical body results in the exercising of the right or left sides of the user's brain. The general theory and concepts behind exercising the brain have been well explored in such books as "The Brain" by Dr. Richard Restack, "Iterhemisperic relations and Cerebral Dominance" by Dr. Mountcastle, and "Recovery from Aphasia" by Dr. Wepman.

In order for the user to utilize the system 10, the user first installs the computer program onto the controller 14. The user next couples the sensors 16, 18, 20 and 22 to the controller 14. With the display 12 connected to the controller 14, the system 10 is turned on and the computer program is started.

The user next couples the sensors 16–22 to his or her left hand, right hand, right foot and left foot. The user then selects the features of the computer program which are desired to run during the session. As shown in detail in the attached microfiche file, the computer program has features for selecting the type of exercise session, the game, the speed of progression through the sequence, the degree of difficulty in the sequence, the percentage of random change, and the presence of sound, both for providing an audible counting as an accompaniment to the sequence and for user distraction purposes. These program choices may be designated by the user either by utilizing computer pull-down menus or computer mouse activated buttons. These controls are programmed, displayed and projected on the display 12 in a manner known to those skilled in the art.

When the user commences the current session, the display 12 will show a plurality of visual images 24, 42 and 46(n). These visual images 24, 42 and 46(n) are sub-divided into four quadrants 26, 28, 30 and 32. Each quadrant 26, 28, 30 and 32 contains an outline of one of a left hand 34, a right hand 36, a right foot 38 or a left foot 40, respectively. The outlines of the left hand 34, right hand 36, right foot 38 and left foot 40 correspond to the sensors 16, 18, 20 and 22 which are coupled to the user's left hand, right hand, right foot and left foot, respectively. The outlines 34–40 are filled in with colors or patterns that change as the computer program sequences through the selection of the appropriate quadrant within the active visual image 24, 42 or 46(n). As the sequence progresses, the outline of the selected or active hand or foot combination will be filled with a bright green color denoting that the corresponding sensor or sensors 16, 18, 20 and/or 22 should be immediately activated or depressed by the user. In other words, the system 10 may prompt the user to activate a single one of the sensors 16–22, or it may prompt the user to activate more than one of the sensors 16–22 essentially simultaneously. Additionally, a quadrant that is about to become active will have the desired hand and foot outlines filled in with a dull or olive green color. The sensors 16, 18, 20 and 22 that correspond to the olive green filled hand and foot should not be depressed at this time, but the user should expect the system to change the filling of these outlines to bright green as the sequence progresses, at which time the user should immediately depress the corresponding sensor(s) 16, 18, 20, and/or 22. The outlines of the hands or feet that are neither selected nor about to become selected are filled in with a third color which is brown in the instant invention. Note that for the system 10 having (n) visual images, a sequence of greater than (n) steps is accomplished by cycling through each of the plurality of visual images 26, 42, and 46(n) a plurality of times.

As the sequence progresses two different types of sounds may be played. The first type of sound is a simple counting sequence that plays the words "one, two, three, four" and follows the sequence of selecting the visual images 24, 42 and 46(n). Note that the maximum number of the count matches the maximum number of visual images 24, 42 and 46(n) shown. The second type of sound is a series of MIDI or CD music files that plays in a rhythm that is distinct from the rhythm of the visual images sequencing. The playing of MIDI or CD music files that is uncoordinated with the rhythm of the visual images sequencing is for the purpose of providing a distraction to the user's concentration, as opposed to an aid in his or her selection of the appropriate sensor 16–22. Both the counting sounds and the MIDI or CD sounds may be turned on or off by the user using the controls of the computer program as shown on the display 12.

As the user progresses through the different sessions, the user may choose to view his score and learn how many hits or misses they have in the current game.

Although the invention has been particularly shown and described with reference to a preferred embodiment thereof, it will be understood by those skilled in the art that changes in form and detail may be made therein without departing from the spirit and scope of the invention.

What is claimed is:

1. A system for exercising a user's concentration and motor skills, comprising, in combination:

control means for providing a plurality of visual images and sounds;

first sensor means coupled to said control means for providing a first input to said control means when said first sensor means is activated by a hand on a selected side of said user, said selected side being one of said user's left and right sides;

second sensor means coupled to said control means for providing a second input to said control means when said second sensor means is activated by a foot on said selected side of said user;

third sensor means coupled to said control means for providing a third input to said control means when said third sensor means is activated by a hand located opposite said selected side; and fourth sensor means coupled to said control means for providing a fourth input to said control means when said fourth sensor means is activated by a foot located opposite said selected side;

wherein each visual image of said plurality of visual images includes four separate quadrants wherein each quadrant corresponds to one of said first, second, third, and fourth sensor means.

2. The system of claim 1 wherein said control means includes means for changing at least a portion of a selected quadrant from a first color to a second color and thereby providing prompts to said user to activate one of said first, second, third, and fourth sensor means corresponding to said selected quadrant.

3. The system of claim 2 wherein said control means includes means for changing at least said portion of said selected quadrant from said first color to said second color, said changing progressing through each visual image of said plurality of visual images in any one of a plurality of random sequences wherein said plurality of random sequences are programmable and selectable by said user with respect to a degree of difficulty and a percentage of random change.

4. The system of claim 3 wherein said control means includes means for adjusting a speed of progression of said sequence.

5. The system of claim 2 wherein said sounds provide means for identifying when a visual image of said plurality of visual images has said selected quadrant therein.

6. The system of claim 1 wherein said sounds provide means for distracting said user's concentration.

7. A system for exercising a user's concentration and motor skills, comprising, in combination:

control means for providing a plurality of visual images and sounds;

first sensor means coupled to said control means for providing a first input to said control means when said first sensor means is activated by a hand on a selected side of said user, said selected side being one of said user's left and right sides;

second sensor means coupled to said control means for providing a second input to said control means when said second sensor means is activated by a foot on said selected side of said user; and wherein each visual image of said plurality of visual images includes four separate quadrants wherein each quadrant corresponds to one of said first and said second sensor means.

8. The system of claim 7 wherein said control means includes means for changing at least a portion of a selected quadrant from a first color to a second color and thereby providing prompts to said user to activate one of said first and said second sensor means corresponding to said selected quadrant.

9. The system of claim 8 wherein said control means includes means for changing at least said portion of said selected quadrant from said first color to said second color, said changing progressing through each visual image of said plurality of visual images in any one of a plurality of random sequences wherein said plurality of random sequences are programmable and selectable by said user with respect to a degree of difficulty and a percentage of random change.

10. The system of claim 9 wherein said control means includes means for adjusting a speed of progression of said sequence.

11. The system of claim 8 wherein said sounds provide means for identifying when a visual image of said plurality of visual images has said selected quadrant therein.

12. The system of claim 7 wherein said sounds provide means for distracting said user's concentration.

13. A method for exercising a user's concentration and motor skills comprising the steps of:

providing control means for providing a plurality of visual images and sounds;

providing first sensor means coupled to said control means for providing a first input to said control means when said first sensor means is activated by a hand on a selected side of said user, said selected side being one of said user's left and right sides;

providing second sensor means coupled to said control means for providing a second input to said control means when said second sensor means is activated by a foot on said selected side of said user;

providing third sensor means coupled to said control means for providing a third input to said control means when said third sensor means is activated by a hand located opposite said selected side; and providing fourth sensor means coupled to said control means for providing a fourth input to said control means when said fourth sensor means is activated by a foot located opposite said selected side;

wherein each visual image of said plurality of visual images includes four separate quadrants wherein each quadrant corresponds to one of said first, second, third, and fourth sensor means.

14. The method of claim 13 wherein the step of providing said control means comprises the steps of changing at least a portion of a selected quadrant from a first color to a second color and thereby providing prompts to said user to activate one of said first, second, third, and fourth sensor means corresponding to said selected quadrant.

15. The method of claim 14 wherein said step of changing at least said portion of said selected quadrant from said first color to said second color, progresses through each visual image of said plurality of visual images in any one of a plurality of random sequences wherein said plurality of random sequences are programmable and selectable by said user with respect to a degree of difficulty and a percentage of random change.

16. The method of claim 15 further including the step of adjusting a speed of progression of said sequence with said control means.

17. The method of claim 14 further including the step of providing said sounds as means for identifying when a visual image of said plurality of visual images has said selected quadrant therein.

18. The method of claim 13 further including the step of providing said sounds as means for distracting said user's concentration.

* * * * *